US008224577B2

(12) United States Patent
Gelies et al.

(10) Patent No.: US 8,224,577 B2
(45) Date of Patent: Jul. 17, 2012

(54) METHOD FOR SETTING UP A MOBILE MACHINE

(75) Inventors: Stephan Gelies, Magdeburg (DE); Juergen Frick, Freiburg (DE); Kurt Rau, Hammersbach (DE); Ute Else Margarethe Rau, legal representative, Hammersbach (DE); Andreas Rau, legal representative, Hammersbach (DE); Michael Rau, legal representative, Hammersbach (DE); Christine Rau, legal representative, Hammersbach (DE)

(73) Assignees: Putzmeister Engineering GmbH, Aichtal (DE); Universitaet Stuttgart, Stuttgart (DE)

( * ) Notice: Subject to any disclaimer, the term of this patent is extended or adjusted under 35 U.S.C. 154(b) by 378 days.

(21) Appl. No.: 12/449,675

(22) PCT Filed: Feb. 20, 2008

(86) PCT No.: PCT/EP2008/052038

§ 371 (c)(1),
(2), (4) Date: Sep. 22, 2009

(87) PCT Pub. No.: WO2008/101944

PCT Pub. Date: Aug. 28, 2008

(65) Prior Publication Data

US 2010/0324824 A1 Dec. 23, 2010

(30) Foreign Application Priority Data

Feb. 21, 2007 (DE) ......................... 10 2007 008 881

(51) Int. Cl.
*G01V 3/38* (2006.01)

(52) U.S. Cl. ............................... 702/5; 702/150; 701/50

(58) Field of Classification Search .............. 702/5, 150, 702/151, 153, 154; 701/50, 23, 25, 124, 701/207, 210, 220, 221; 340/686.1
See application file for complete search history.

(56) References Cited

U.S. PATENT DOCUMENTS

| | | | | |
|---|---|---|---|---|
| 5,646,844 | A | 7/1997 | Gudat et al. | |
| 6,202,013 | B1 * | 3/2001 | Anderson et al. | 701/50 |
| 2005/0278099 | A1 | 12/2005 | Benckert et al. | |
| 2008/0024318 | A1 | 1/2008 | Hall et al. | |

FOREIGN PATENT DOCUMENTS

DE 102 40 180 3/2004

(Continued)

OTHER PUBLICATIONS

International Search Report, mailed Jul. 15, 2008.

*Primary Examiner* — Manuel L Barbee
(74) *Attorney, Agent, or Firm* — Collard & Roe, P.C.

(57) ABSTRACT

The invention relates to a method for setting up a mobile machine (1), particularly an automatic concrete pump, a mobile crane or a movable elevating work platform. With such a method, the subsurface (28) of a site is analyzed for the properties and/or load-bearing capacity thereof before the machine (10) is positioned there and/or oriented and supported by means of flarable supporting legs (20, 24) in set-up positions (VR, VL, HR, HL) suitable according to the determined subsurface properties and load-bearing capacity. In order to determine an optimized set-up position for the supporting legs (20, 24), geodata (38) of a geographic environment that includes the site is read via a computer in a data memory (44) using a layer of subsurface data (40) that defines the subsurface properties and load-bearing capacity. In addition, the geographic position of the machine (1) and the orientation thereof at the site are determined and linked in the form of a data set that defines at least the geographic set-up positions (VR, VL, HR, HL) of the flared supporting legs (20, 24) to the imported geodata and subsurface data (38, 40). Then, the machine (1) is navigated with the supporting legs (20, 24) into a set-up position that is suited according to the imported geodata and subsurface data.

14 Claims, 4 Drawing Sheets

FOREIGN PATENT DOCUMENTS

| | | | |
|---|---|---|---|
| DE | 103 20 382 | | 12/2004 |
| JP | 09-112032 | | 4/1997 |
| JP | 2003-221183 | | 8/2003 |
| JP | 2005-155285 | | 6/2005 |
| WO | WO 03/087720 | | 10/2003 |
| WO | WO 03087720 | A1 * | 10/2003 |

* cited by examiner

METHOD FOR SETTING UP A MOBILE MACHINE

CROSS REFERENCE TO RELATED APPLICATIONS

This application is the National Stage of PCT/EP2008/052038 filed on Feb. 20, 2008, which claims priority under 35 U.S.C. §119 of German Application No. 10 2007 008 881.9 filed on Feb. 21, 2007. The international application under PCT article 21(2) was not published in English.

BACKGROUND OF THE INVENTION

1. Field of the Invention

The invention relates to a method for setting up a mobile work machine, in which the subsurface at a location of use is analyzed with regard to its composition and/or load-bearing capacity, before the work machine is positioned there and/or oriented and supported by means of support legs that can be moved out, into suitable set-up positions, in accordance with the subsurface composition and load-bearing capacity that has been determined.

2. The Prior Art

Mobile work machines such as concrete pump trucks, mobile cranes, and elevating work platforms, are provided with support legs that can be moved out, and are supposed to improve the stability of the work machine at the location of use. In this connection, the support legs have the task, on the one hand, of raising the vehicle axles, in order to use their inherent weight as standing weight. For another thing, the support legs are supposed to prevent tipping of the work machine, if high tipping moments are produced by way of a work boom. Furthermore, because of the ground pressure produced by way of the support legs standing on it, the subsurface is subject to settling. It is difficult for a lay person to assess the subsurface, so that incorrect assessments of the subsurface properties occur again and again. This is all the more true if there are cavities in the subsurface, such as sewer lines, horizontal tunnels, shafts, power lines and the like. Failure of the substructure underneath the support legs can cause the mobile work machine to fall over. Up to the present, reliable detection of cavities underneath the set-up surfaces of mobile work machines has not been accomplished.

Proceeding from this, the invention is based on the task of improving a method of the type indicated initially, to the effect that a reliable prediction concerning the load-bearing capacity of the subsurface can already be made before the work machine is set up.

SUMMARY OF THE INVENTION

To accomplish this task, the combination of characteristics indicated in claim 1 is proposed. Advantageous embodiments and further developments of the invention are evident from the dependent claims.

The solution according to the invention proceeds from the recognition that many municipalities make data concerning known and recorded cavities, such as sewer lines, horizontal tunnels, shafts, power lines, etc. available digitally in a geographic information system (GIS), and that some of these data can be called up online, for example by way of the Internet. Nowadays, mobile work machines frequently use an Internet-capable interface, such as GSM, UMTS, GPRS, for example, by way of which data can be called up from the municipal servers and information can be obtained. Once the precise position of the mobile work machine is known, potentially hazardous cavities can therefore be recognized by way of an online query of GIS data. Accordingly, the solution according to the invention essentially consists in the following,

- geodata of a geographic area that contains the location of use, having a layer of known subsurface data that define the subsurface composition and load-bearing capacity, are read into a data memory, by way of a computer,
- the geographic position of the work machine and its orientation at the location of use are determined and linked with the geodata and subsurface data that have been read in, in the form of a data set that defines at least the geographic set-up positions of the extended support legs,
- and the work machine, with its support legs, is navigated into a suitable set-up position, in accordance with the geodata and subsurface data that have been read in, in each instance.

In the following, the term "geodata" is supposed to be understood to mean essentially the cartographic path data in terms of longitude and latitude, which indicate the path of the work machine to the location of use and the cartographic conditions of the surroundings of the location of use on the earth's surface. The subsurface data also form a system of attributes of the subsurface, indicated in the longitude and latitude system of the earth's surface, such as cavities and the like, which can be decisive for the load-bearing capacity of the subsurface, and are superimposed on the geodata as a layer. The subsurface data can be derived, for example, from the digital line records of the municipalities for water, sewer, gas, and electricity, by way of an online data network. The geodata and the subsurface data can be available in the form of points, lines, and areas, or as grid data, in the form of pixels. The data structures used essentially correspond to graphics and CAD programs known at this time.

A preferred embodiment of the invention provides that the geodata and subsurface data read into the data memory are displayed on a screen as a geographic representation, and that the geographic set-up positions of the support legs are inserted into the geographic screen representation of the geodata and subsurface data, and moved relative to these when the work machine is navigated. A preferred embodiment of the invention provides that the geographic position of the work machine at the location of use is determined by way of a satellite-supported positioning system, such as the American GPS or the European Galileo system, which is disposed in fixed manner on the machine.

In order to additionally be able to determine the precise geographic set-up position of the support legs, a determination of the geographic orientation of the work machine at the location of use, in other words the orientation of the longitudinal vehicle axis of the work machine with reference to the points of the compass, is furthermore required. The geographic orientation of the work machine can be determined, for example, by way of a second satellite-supported positioning system disposed in fixed manner on the machine, at a distance from the satellite-supported positioning system. Alternatively to this, the geographic orientation of the work machine can be determined by way of an inertial sensor system fixed in place on the machine, for example by way of a fiber gyroscope, gyroscope compass, or a laser gyroscope.

Using the method steps described below, it is possible to navigate the work machine, at the location of use, into a suitable set-up position for its support legs, either manually, by a machine operator, or automatically, and to support it there.

On the other hand, it is possible, using the measures according to the invention, to simulate the drive of the work machine to the location of use and its set-up, using a model data set of the work machine inserted into the geodata and subsurface data, and to store the drive-up paths and/or set-up positions in a route value or reference value memory, for later navigation of the work machine to the set-up location.

BRIEF DESCRIPTION OF THE DRAWINGS

The invention will be explained in greater detail in the following, using a drawing that shows an exemplary embodiment schematically. This shows.

DETAILED DESCRIPTION OF THE PREFERRED EMBODIMENTS

Figure 1:
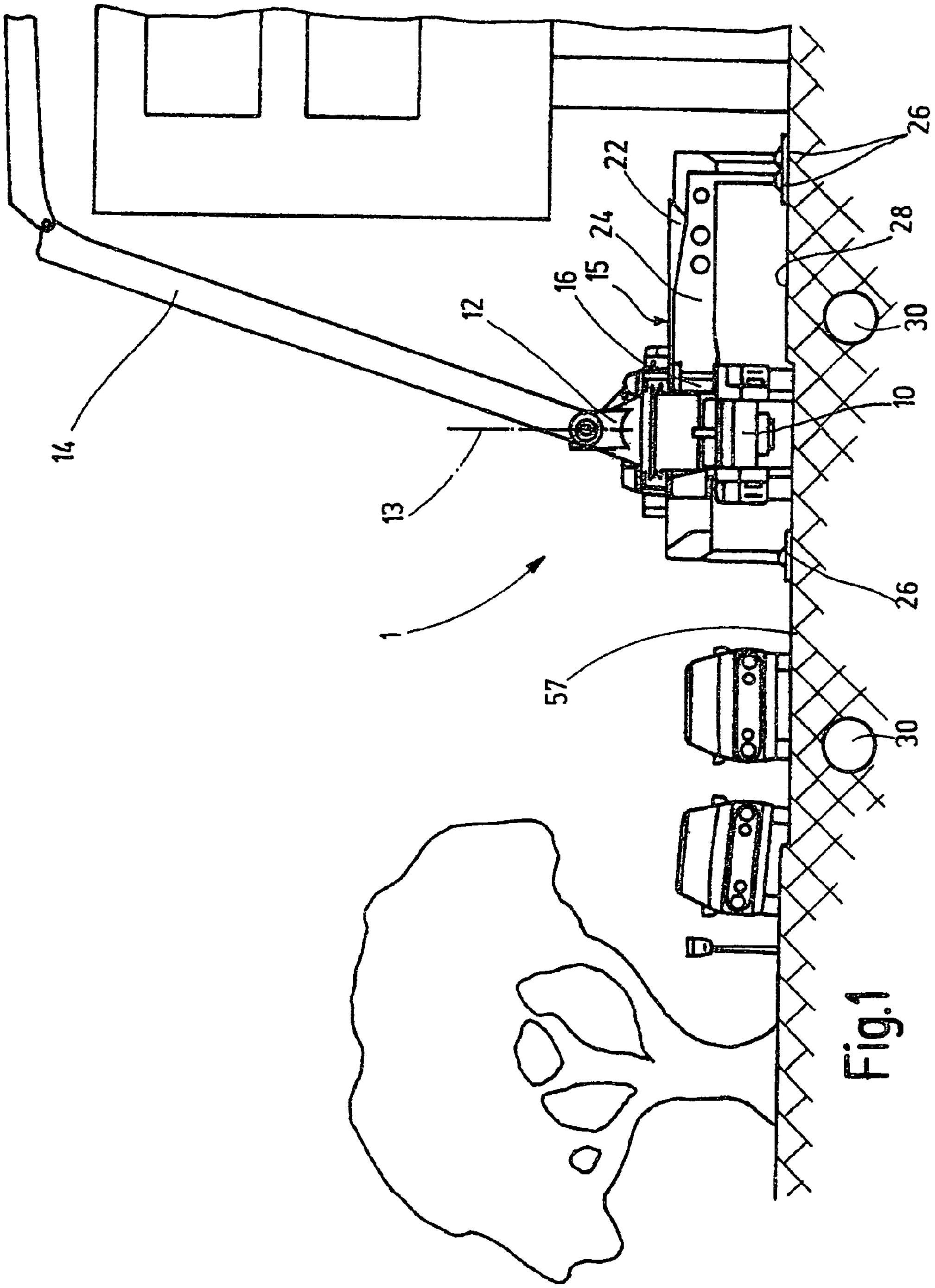
FIG. 1 a view of a concrete pump truck set up at the edge of a road, with support legs supported in narrow manner on the road side.
Figure 2A:
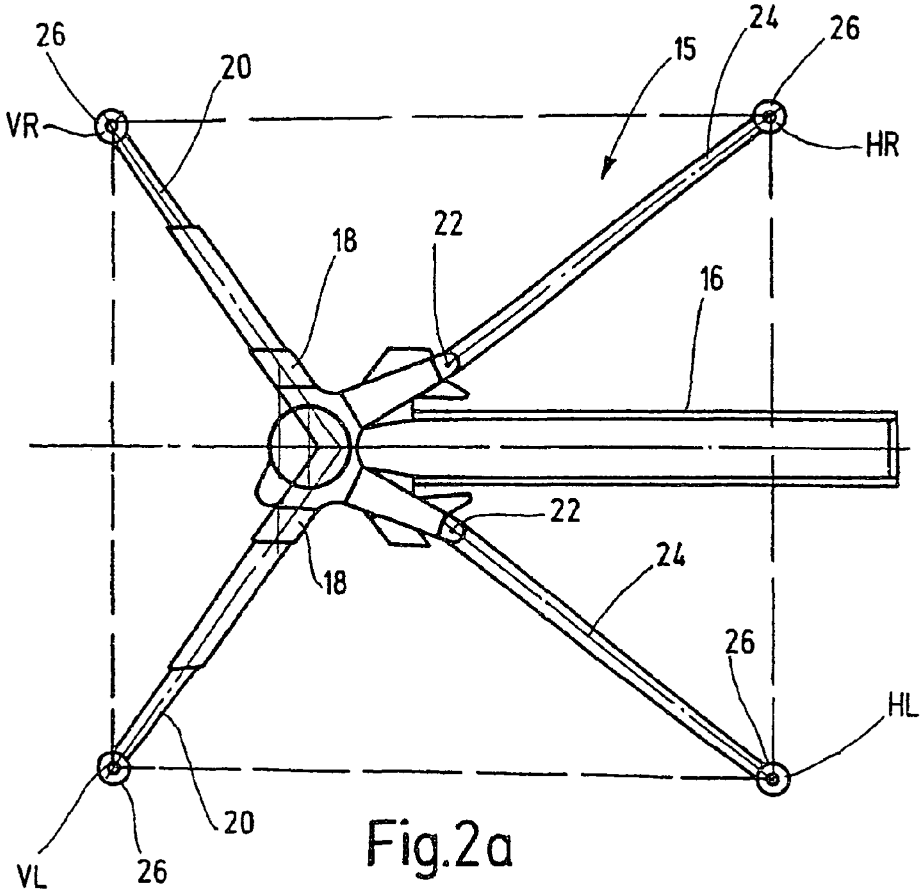
FIG. 2*a, b* a top view of the support construction of the concrete pump truck according to FIG. 1, in the state of full support and of narrow support.
Figure 2B:
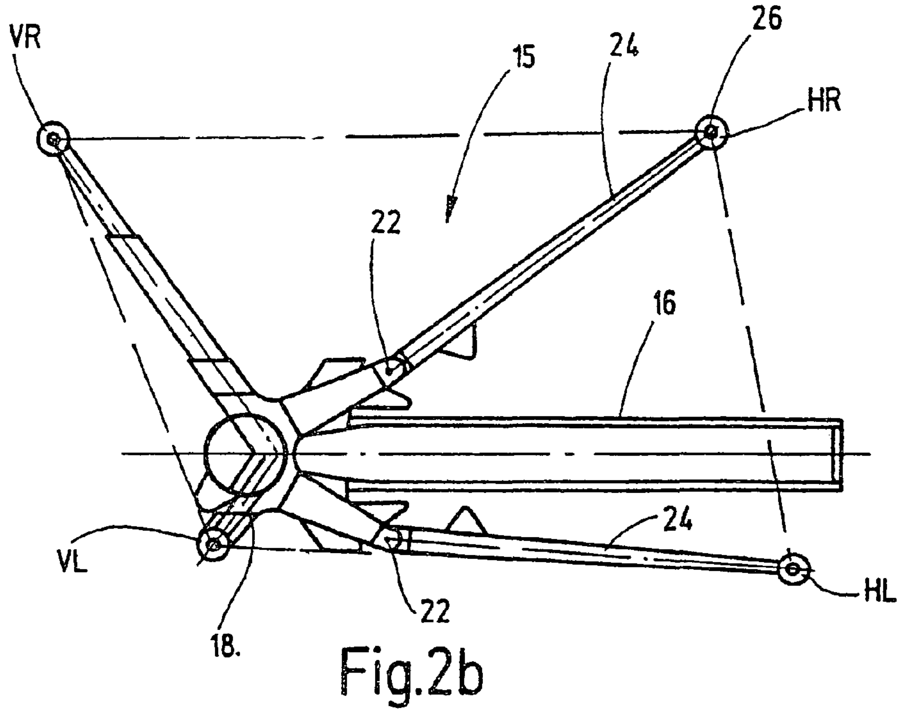

The concrete pump truck 1 shown in FIGS. 1 and 2 consists essentially of a multi-axle chassis 10, a concrete distributor mast 14 mounted to rotate about a vertical axis 13, which is fixed in place on the chassis, on a mast base 12 located close to the front axle, and a support construction 15 that has a support frame 16 fixed in place on the chassis, two front support legs 20 that can be displaced on the support frame 16, each in a telescope segment 18 configured as an extension box, and two rear support legs 24 that can pivot about a vertical axis 22. The support legs 20, 24 can each be supported on the subsurface 28 with a support foot 26 that can be moved out downward. The front and rear support legs 20, 24 can be moved out using hydraulic means, from a driving position close to the chassis, to a support position. In the case of the example shown in FIG. 1, a narrow support was chosen on the road side. The narrow support can be used to take space problems on construction sites into account. However, it leads to restrictions in the angle of rotation of the concrete distributor mast 14. FIG. 2*a* shows the support construction of the concrete pump truck according to FIG. 1 in the state of full support, and FIG. 2*b* shows it in the state of narrow support.

During positioning of the concrete pump truck 1, just as in the case of any other work machine that has support legs, the important thing is that the subsurface 28 is sufficiently capable of bearing the load. In the selection of the set-up positions of the support legs, attention must be paid to ensure that there are no cavities 30 in the subsurface 28 there, which could lead to collapse of the subsurface and toppling of the work machine 1.

Figure 3:
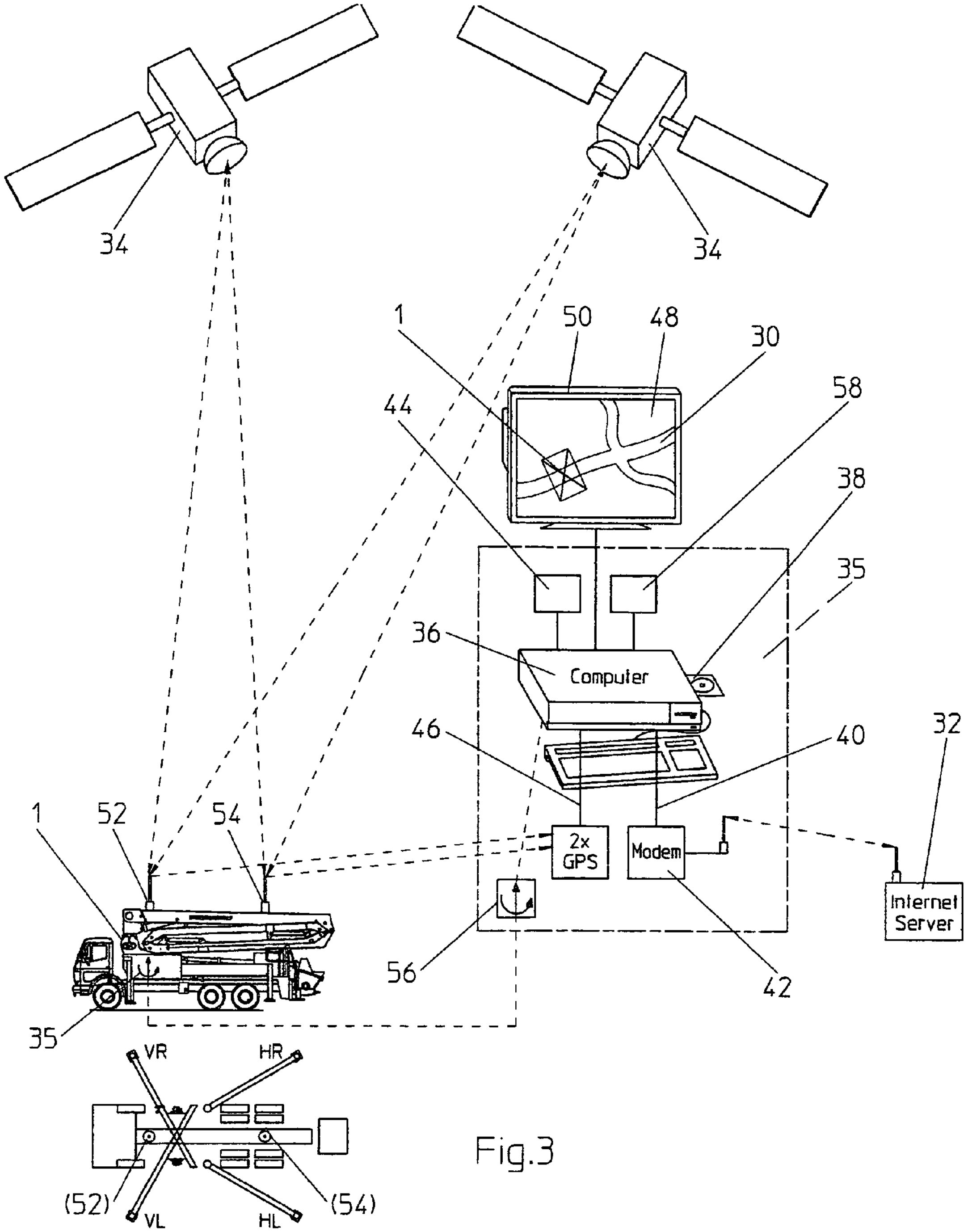
FIG. 3 a block schematic of a circuit arrangement for setting up a concrete pump at the location of use.

A particular feature of the present invention consists in that it is possible to prevent setting the work machine 1 up on known cavities 30 or other defects in the ground, by means of the use of geodata, within the scope of geo information systems (GIS) 32 that are available in online databases (Internet), in combination with geographic positioning and orientation of the work machine supported by a satellite 34. See FIG. 3. The important thing in this connection is that the set-up positions VR, VL, HR, HL of the support feet 26 on the extended support legs 20, 24 are not in the immediate vicinity of cavities 30 disposed underneath them.

In order to prevent this, the work machine has a circuit arrangement 35 having an onboard computer 36, by way of which the geodata 38 of a location of use, together with a layer of known subsurface data 40 that define the subsurface composition and load-bearing capacity can be requested from a municipal geo-information data server 32, by way of an Internet-capable interface (GSM, UMTS, GPRS) 42, and read into a data memory 44. Furthermore, the position of the work machine 1, in other words its geographic position and orientation at the location of use, is determined and linked with the geodata and subsurface data 38, 40 that have been read in, in the form of a data set 46 that defines at least the geographic set-up positions VR, VL, HR, HL of the extended support legs 20, 24. Based on these data, the work machine 1, with its support legs 20, 24, is navigated into a suitable set-up position, free of cavities, in each instance, in accordance with the geodata and subsurface data 38, 40 that have been read in. For this purpose, the geodata and subsurface data read into the data memory 44 can be displayed on a screen 50, together with the related cavity positions 30, as a geographic representation 48, while the geographic set-up positions of the support legs can be inserted into the geographic screen representation 48 of the geodata and subsurface data, and moved relative to these during navigation of the work machine 1. The evaluation can then take place either visually, by the machine operator, or by means of an assessment of the potential set-up positions at the location of use by the computer 36.

The geographic position of the work machine at the location of use is determined, in the case of the exemplary embodiment shown, by way of a satellite-supported positioning system 52 fixed in place on the machine. The additionally required geographic orientation of the work machine 1 at the location of use can be determined either by way of a second positioning system 54 fixed in place on the machine at a distance from the first positioning system 52, or by way of an inertial sensor system fixed in place on the machine. In this connection, it is practical if the latter is configured as a laser gyroscope 56 or as a laser fiber gyroscope. In the case of automatic entry of the data, the suitability or non-suitability of a set-up position can be indicated by means of an optical or acoustical release signal or warning signal.

Figure 4:
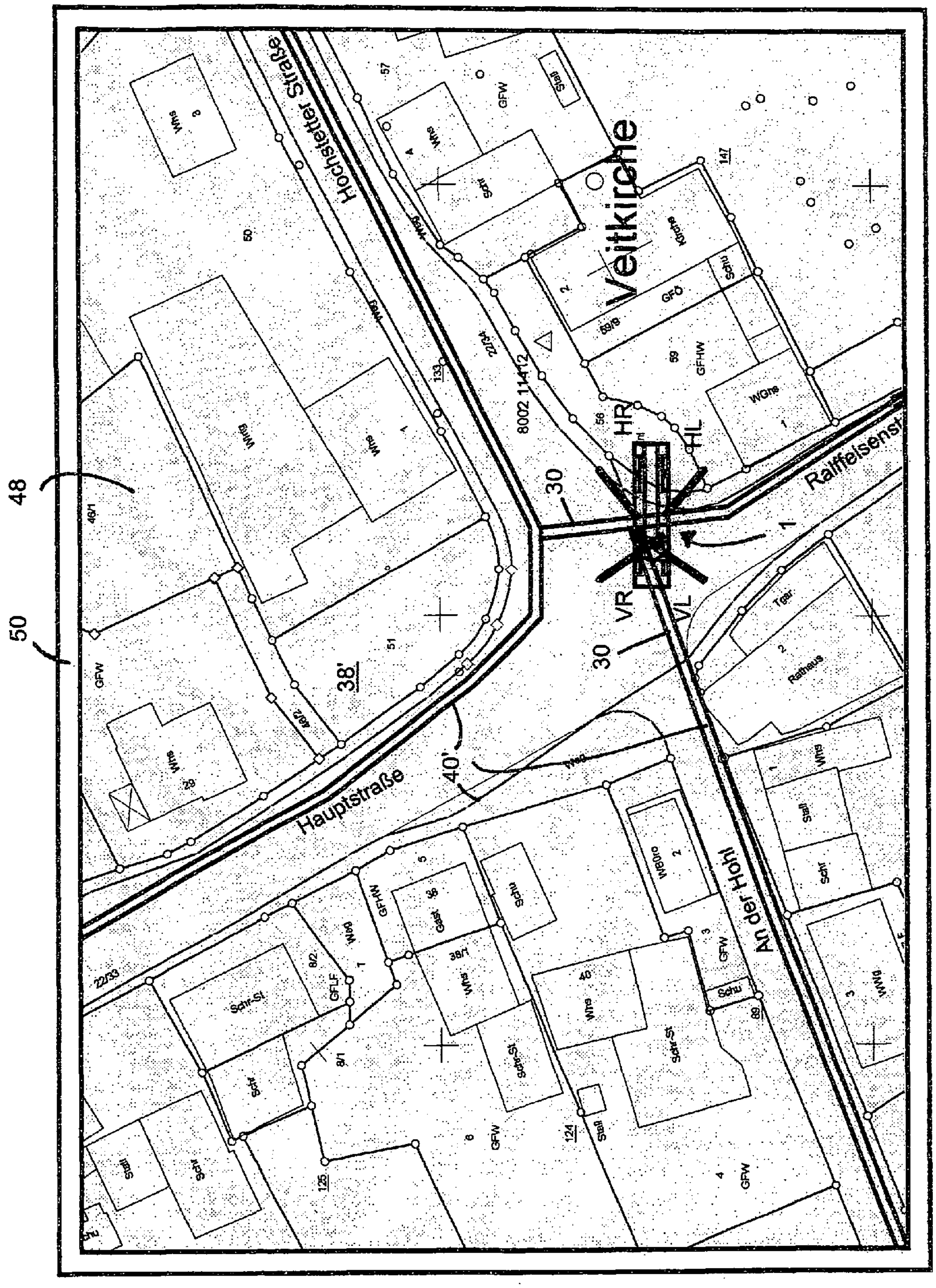
FIG. 4 an enlarged representation of the screen according to FIG. 3, with a cartographic representation of the location of use of the concrete pump, with geographic subsurface data and optimized set-up positions for the support legs of the work machine.

The screen content 48 of the computer system is shown as an example in FIG. 4. There, the geographic surroundings 38' of a location of use for the work machine 1 are shown, together with the progression of the subsurface data 40' that define the subsurface composition and load-bearing capacity, and have been obtained from municipal line records, for example. Furthermore, the cartographic representation shows the clear road surfaces and areas on which the work machine 1 can be driven, and which are fundamentally suitable for support of the work machine. During set-up, attention must be paid to ensure that the set-up positions VR, VL, HR, HL of the extended support legs 20, 24 of the work machine come to lie outside of the sewers or cavities 30 that reduce the load-bearing capacity of the subsurface. In the case of traveled roads having a certain amount of traffic, it is furthermore possible that part of the available road surface 57 remains available for traffic, by means of a narrow support as in the case of FIGS. 1 and 2*b*.

With the method described above, the possible set-up positions and orientations of the work machine 1 can already be determined in the planning phase. Therefore it is possible, particularly in the case of complicated locations of use, to plan in advance in what direction and from what side the work machine 1 drives to the location of use, so that it can be optimally supported with regard to the available set-up positions. This is achieved in that the drive of the work machine to the site, and its set-up, are simulated using a model data set of the work machine 1 that is inserted into the geodata and subsurface data 38', 40', and the drive-up paths and/or set-up positions determined in this connection are stored in a route memory or reference value memory 58, for later navigation of the work machine 1.

In summary, the following should be stated: The invention relates to a method for setting up a mobile work machine 1, particularly a concrete pump truck, a mobile crane, or a mobile elevating platform. In such a method, the subsurface 28 at a location of use is analyzed with regard to its composition and/or load-bearing capacity, before the work machine 1 is positioned there and/or oriented and supported by means of support legs 20, 24 that can be moved out, into suitable set-up positions VR, VL, HR, HL, in accordance with the subsurface composition and load-bearing capacity that has been determined. In order to determine an optimal set-up position for the support legs 20, 24, geodata 38 of a geographic area that contains the location of use, having a layer of known subsurface data 40 that define the subsurface composition and load-bearing capacity, are read into a data memory 44, by way of a computer. Furthermore, the geographic position of the work machine 1 and its orientation at the location of use are determined and linked with the geodata and subsurface data 38, 40 that have been read in, in the form of a data set that defines at least the geographic set-up positions VR, VL, HR, HL of the extended support legs 20, 24. Then, the work machine 1, with its support legs 20, 24, is navigated into a suitable set-up position, in accordance with the geodata and subsurface data that have been read in, in each instance.

The invention claimed is:

1. Method for setting up a mobile work machine (1), in which the subsurface (28) at a location of use is analyzed with regard to its composition and/or load-bearing capacity, before the work machine (1) is positioned there and/or oriented and supported by means of support legs (20, 24) that can be moved out, into suitable set-up positions (VR, VL, HR, HL), in accordance with the subsurface composition and load-bearing capacity that has been determined, wherein geodata (38) of a geographic area that contains the location of use, having a layer of known subsurface data (40) that define the subsurface composition and load-bearing capacity, are read into a data memory (44), by way of a computer, wherein the geographic position of the work machine (1) and its orientation at the location of use are determined and linked with the geodata and subsurface data (38, 40) that have been read in, in the form of a data set that defines at least the geographic set-up positions (VR, VL, HR, HL) of the extended support legs (20, 24), and wherein the work machine (1), with its support legs (20, 24), is navigated into a suitable set-up position, in accordance with the geodata and subsurface data that have been read in, in each instance.

2. Method according to claim 1, wherein the geodata and subsurface data (38, 40) read into the data memory (44) are displayed on a screen (50) as a geographic representation (48), and wherein the geographic set-up positions (VR, VL, HR, HL) of the support legs (20, 24) are inserted into the geographic screen representation (48) of the geodata and subsurface data (38, 40), and moved relative to these when the work machine (1) is navigated.

3. Method according to claim 1, wherein the geographic position of the work machine (1) at the location of use is determined by way of a satellite-supported positioning system (52) fixed in place on the machine.

4. Method according to claim 3, wherein the geographic orientation of the work machine at the location of use is determined by way of a second satellite-supported positioning system (54) disposed in fixed manner on the machine, at a distance from the positioning system (52).

5. Method according to claim 1, wherein the geographic orientation of the work machine (1) at the location of use is determined by way of an inertial sensor system (56) fixed in place on the machine.

6. Method according to claim 5, wherein the inertial sensor system (56) is configured as a fiber gyroscope or as a laser gyroscope.

7. Method according to claim 1, wherein the subsurface data (40) contain digital geo-information data about cavities (30), sewers, power lines in the subsurface (28).

8. Method according to claim 1, wherein the subsurface data (40) are read in in the form of pixel files, and processed in the computer (36).

9. Method according to claim 1, wherein the subsurface data (40) are read in in the form of vector files, and processed in the computer (36).

10. Method according to claim 1, wherein the geodata and/or subsurface data (38, 40) are called up by way of an online database (32).

11. Method according to claim 1, wherein the drive of the work machine to the location of use and its set-up are simulated, using a model data set of the work machine (1) inserted into the geodata and subsurface data (38, 40), and wherein the drive-up paths and/or set-up positions are stored in a route value or reference value memory (58), for later navigation of the work machine (1) to the location of use.

12. Method according to claim 1, wherein the work machine (1) is navigated to a suitable set-up position by a machine operator, and supported there.

13. Method according to one claim 1, wherein the work machine (1) is automatically navigated to the set-up positions (VR, VL, HR, HL) of its support legs (20, 24), using its measured geographical position and orientation data (46), in accordance with the geodata and subsurface data (38, 40) that have been determined, and supported there.

14. Method according to claim 1, wherein the suitability or non-suitability of a potential set-up position is indicated by means of an optical or acoustical release signal or warning signal.

* * * * *

UNITED STATES PATENT AND TRADEMARK OFFICE

CERTIFICATE OF CORRECTION

PATENT NO. : 8,224,577 B2
APPLICATION NO. : 12/449675
DATED : July 17, 2012
INVENTOR(S) : Gelies et al.

It is certified that error appears in the above-identified patent and that said Letters Patent is hereby corrected as shown below:

In the Claims:

In Column 6, line 45 (Claim 13) after “to”, please delete the word: “one”.

Signed and Sealed this
Third Day of September, 2013

Teresa Stanek Rea
*Acting Director of the United States Patent and Trademark Office*